Figure 1:
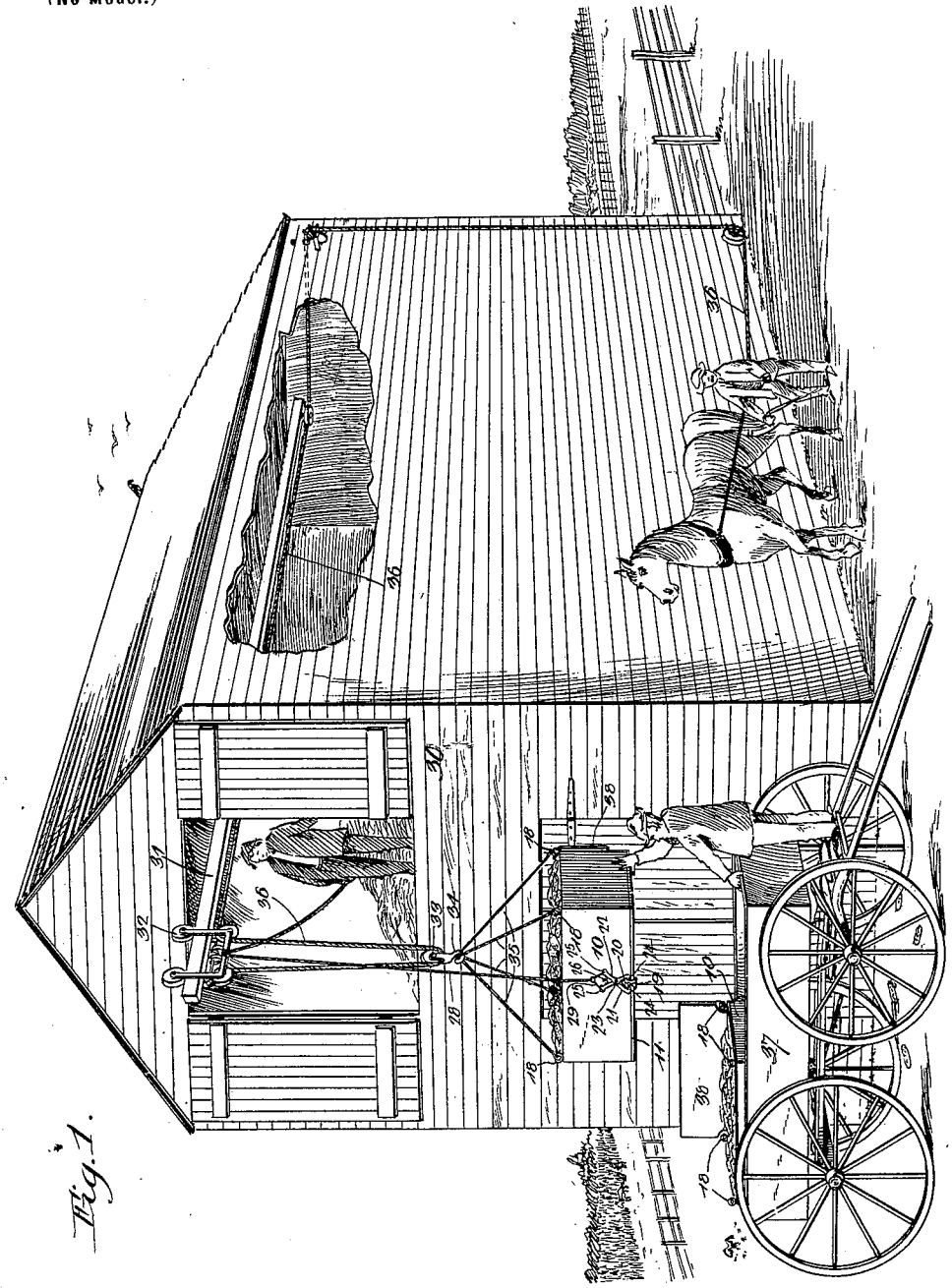

No. 644,533. Patented Feb. 27, 1900.
T. M. McINTOSH.
APPARATUS FOR LOADING OR UNLOADING.
(Application filed Apr. 25, 1899.)
(No Model.) 2 Sheets—Sheet 1.

Witnesses
J. Frank Culverwell.
H. J. Bamberg.

Thomas M. McIntosh, Inventor.
By his Attorneys,
C. A. Snow & Co.

THE NORRIS PETERS CO., PHOTO-LITHO., WASHINGTON, D. C.

No. 644,533. Patented Feb. 27, 1900.
T. M. McINTOSH.
APPARATUS FOR LOADING OR UNLOADING.
(Application filed Apr. 25, 1899.)
(No Model.) 2 Sheets—Sheet 2.
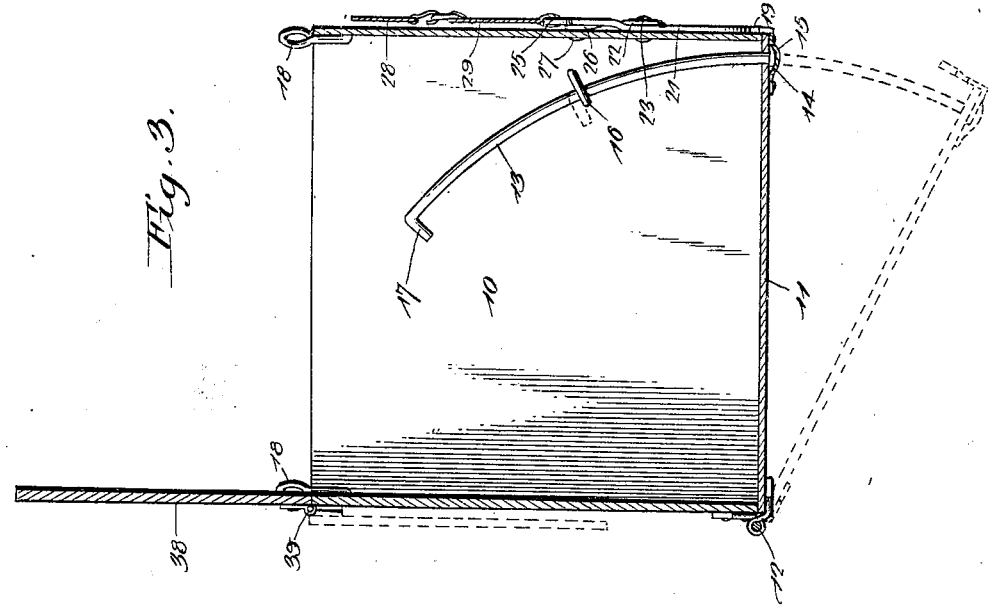
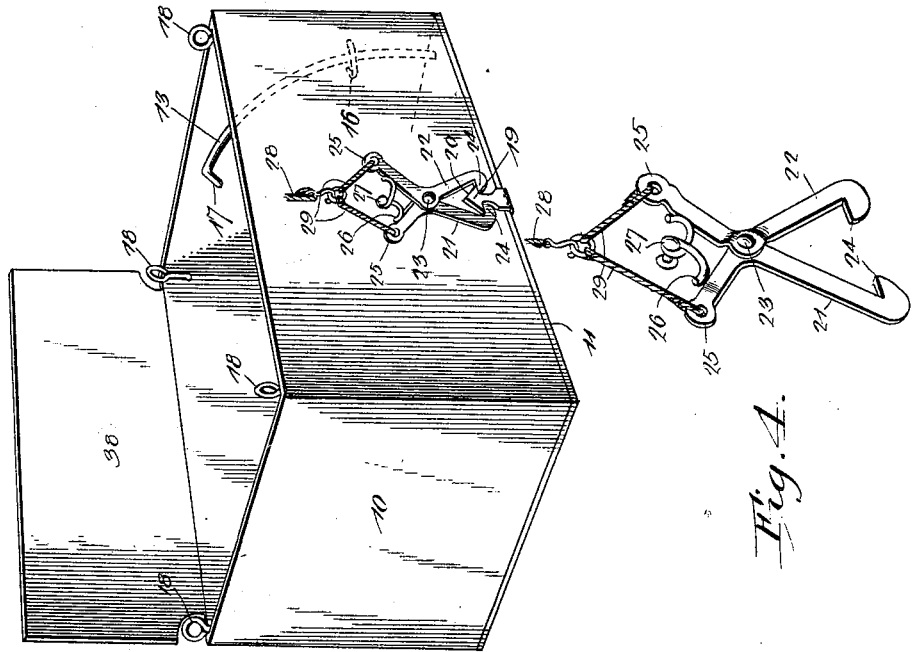
Witnesses
J. Frank Culverwell.
H. F. Beuchorse
Thomas M. McIntosh, Inventor.
By his Attorneys,
C. A. Snow & Co.
THE NORRIS PETERS CO., PHOTO-LITHO., WASHINGTON, D. C.

UNITED STATES PATENT OFFICE.

THOMAS M. McINTOSH, OF HASTINGS, NEBRASKA, ASSIGNOR OF ONE-THIRD TO HENRY S. BROWN, OF SAME PLACE.

APPARATUS FOR LOADING OR UNLOADING.

SPECIFICATION forming part of Letters Patent No. 644,533, dated February 27, 1900.

Application filed April 25, 1899. Serial No. 714,444. (No model.)

*To all whom it may concern:*

Be it known that I, THOMAS M. MCINTOSH, a citizen of the United States, residing at Hastings, in the county of Adams and State of Nebraska, have invented a new and useful Apparatus for Loading or Unloading, of which the following is a specification.

My invention relates to an apparatus for loading and unloading grain; and the object in view is to provide means especially adapted for use by farmers for gathering ears of corn after they shall have been husked and adapted to be unloaded expeditiously in a corn-crib, barn, or other place of storage, although the apparatus is equally well adapted for use in handling cereals of all kinds, such as shelled corn, wheat, oats, rye, and other substances.

My invention contemplates the employment of a receptacle with a foldable buttboard and with a hinged bottom which is fastened in a closed position by a trip-latch device, said receptacle having means for the attachment of a raising and carrying mechanism by which the receptacle may be lifted from the vehicle on which it is loaded and from thence transported into a crib or other structure, after which the bottom is released to discharge the load, all of these operations being carried out expeditiously to unload the cereal in a storage structure.

The invention further consists in the novel construction and arrangement of parts, which will be hereinafter fully described and claimed.

In the drawings, Figure 1 is a perspective view of a storage structure partly broken away and equipped with a carrier apparatus adapted to remove cereals from a portable vehicle. Fig. 2 is an enlarged detail perspective view of a cereal receptacle or cage. Fig. 3 is a vertical cross-section of said cereal-receptacle, showing the butt-board raised to its operative position in full lines and in its folded position by dotted lines. Fig. 4 is a detail view, on an enlarged scale, of the trip-latch.

The same numerals of reference denote like and corresponding parts in each of the several figures of the drawings.

The cereal-receptacle 10 of my invention may be made of wood, sheet metal, closely-woven fabric, or any other suitable material, and said receptacle may be of any appropriate form and dimensions. As shown by Figs. 2 and 3 of the drawings, the receptacle is of generally oblong form, and in the practical adaptation of the apparatus I prefer to make a receptacle of large size, so as to occupy about one-half the floor-space of a wagon-body or other suitable portable vehicle, whereby two of the receptacles may be loaded on the vehicle, so as to be filled with ears of corn in the field.

The cereal-receptacle 10 is provided with a movable bottom 11, having one of its edges connected to a side wall of the receptacle by spring-hinges 12, of ordinary construction, and which act against the hinged bottom to normally hold the same in a raised position for closing the lower side of the receptacle 10. To this hinged bottom 11 are fastened the lower ends of curved guide-rods 13, and these guide-rods are adapted to limit the descent of the hinged bottom when the latter assumes a proper inclined position for discharging the load from the receptacle. Each rod has its lower end passed through and secured to the bottom 11, as indicated at 14, and the joint between the rod and the bottom is protected by a plate 15, which is fitted over the headed end 14 of the rod and is secured to the bottom. On the end walls of the receptacle are fastened the keepers 16, adapted to slidably confine the guide-rods in proper relation to the receptacle, and said rods are provided with hook-shaped upper ends 17, which engage with the keepers to limit the descent of the rods, and consequently arrest the opening movement of the hinged bottom 11.

To the corners of the cereal-receptacle 10 are firmly secured the lifting-eyebolts 18, which provide for the proper attachment of the cables or chains that are connected to the lifting and carrying apparatus.

The hinged bottom 11 is kept in its closed position against the weight of the load of cereal therein by means of a trip-controlled latch which is adapted to be operated when the receptacle is in its elevated position within the storage structure. One element of this latch mechanism is a catch 19, which is fixed firmly to the bottom 11 at the free edge thereof, and this catch is provided with a beveled and shouldered head 20, which is adapted to project above the bottom and to lie alongside of the receptacle when the bottom is closed. The members 21 22 of the trip-latch are each of angular construction and arranged in reverse positions, as indicated by Fig. 4, so that the angular portions of the latch members will overlap one another and may be pivotally fastened to the receptacle 10 by a single bolt or pin 23. The lower ends of the latch members are formed with the beaks 24, while the upper ends of said members diverge, as at 25. A spring 26 is fastened by a screw or clamp at 27 to the receptacle in a position between the diverging ends of the latch members, and the arms of said spring normally act against the ends 25 of the latch members in order to force them away from each other, and thereby press the beaks 24 of the latch toward each other. When the hinged bottom 11 is closed, the headed and shouldered end 20 of the catch impinges against the beaks 24 of the latch members, and said members are made to yield against the tension of the spring 26, so that the catch may snap into engagement automatically with the latch. A trip-cord 28 is provided with branches 29, which are fastened to the diverging ends 25 of said latch members, and an upward pull on this trip-cord draws the ends 25 of the latch members inwardly toward each other, thus releasing the latch from engagement with the catch-plate and permitting the weight of the load within the receptacle to open the bottom against the tension of the spring-hinges. Each receptacle 10 is furthermore provided on one side with a butt-board 38, which is connected by hinges 39 to the top edge of one side wall of the receptacle. This butt-board is adapted to be raised to a vertical position over the side wall in order to lie in the plane thereof and present a barrier against the passage of the ears of corn when they are thrown toward the receptacle. When the board is in its vertical position, its lower edge rests squarely upon the top edge of the side of the receptacle and forms therewith a butt-joint, and the weight of the board is so much greater than that of the ears of corn that ordinarily the board will remain in its elevated position without any other retaining means than the resistance caused by its own inertia and the friction of the hinges by which it is secured to the side of the receptacle. However, if desired, any other suitable additional means may be employed to keep the board upright—as, for instance, a detachable brace similar to the permanent braces in an ordinary trunk. The hinges are arranged in such relation to the receptacle as to permit the butt-board to be folded in a downward direction alongside of the receptacle, and the butt-board may thus be disposed out of the way of the suspension-ropes 35 when the receptacle is elevated and suspended from the carrier apparatus.

In Fig. 1 of the drawings I have represented the storage structure 30, within which the cereal is to be deposited. This structure may be a corn-crib, a barn, or other suitable building, and it is equipped with an elevated track 31, which is suspended in a horizontal position by any suitable contrivances known to the art. On this elevated track is adapted to travel a wheeled carrier 32 of any preferred type, and said carrier is equipped with a pulley-block 33, which sustains the hook 34. Suspension-ropes 35 are fastened to the eyebolts 18 at the corners of the cereal-cage, and these ropes are adapted to be adjusted into engagement with the hook 34 of the carrier apparatus. A haulage-rope 36 is reeved through the carrier apparatus and the pulley-block 33, and said rope is equipped with suitable hitching devices by which a draft-animal may be connected to the rope for the purpose of elevating the loaded cage and of moving the carrier apparatus and the cage to any desired place within the storage structure.

To expeditiously handle the grain, I employ a portable apparatus, such as the vehicle indicated generally by the numeral 37 in Fig. 1, and a series of the receptacles 10 are employed, preferably two of such receptacles, which are of proper dimensions to fill the vehicle. This vehicle is drawn to the field where the corn is being husked, and the butt-boards 38 of the receptacle are raised to the position shown by full lines in Fig. 2. After the ears of corn are husked they are thrown into the vehicle, and any tendency of the corn to pass over the receptacle is arrested by the butt-boards. When the receptacles on the vehicle are filled to their capacity with ears of corn, the vehicle is drawn to the storage structure 30, and I then proceed to unload the receptacles. The butt-board of each receptacle is lowered to the position shown by dotted lines in Fig. 3, and the suspension-ropes 35 are connected to the eyebolts 18 of the receptacle. The draft of the haulage-cable 36 lifts the receptacle and its load from the vehicle and serves to suspend the loaded receptacle below the carrier apparatus 32. This carrier apparatus may travel on the elevated track 31 until the loaded receptacle reaches the place of discharge within the storage structure. The operator pulls the trip-rope 28 to actuate the latch members 21 22 in a manner to release them from the catch 19, and the weight of the load within the receptacle overcomes the tension of the spring-hinges, whereby the bottom 11 is lowered to an inclined position within the limits of the play of the guide-rods 13 within the keepers 16. The bottom is adapted to drop to an inclined position for discharging the load from the receptacle, and after the ears of corn shall have been discharged the spring-hinges 12 raise the bottom. The carrier apparatus may be drawn out of the structure and the haulage-cable slackened to permit the receptacle to be lowered to the ground, and the hinged bottom may then be fastened by the latch, after which the suspension-ropes 35 should be disconnected from the eyebolts of the receptacle.

My apparatus is especially adapted for use by farmers in gathering the husked corn and in loading the same into barns or corn-cribs, and from the foregoing description it will readily be seen that the farmer may load the corn into a vehicle, draw the load to the storage structure, and expeditiously deposit the load into such structure. The receptacle is simple in construction and efficient and durable in service. Its latch is actuated positively to prevent accidental opening of the hinged bottom, and the receptacle embodies means by which it may be connected readily to a carrier and elevating apparatus.

Although I have described the apparatus as especially adapted for handling corn in the ear, I do not restrict myself to the use of the apparatus for this particular substance, because I am aware that the receptacles may be used for containing shelled corn, wheat, oats, rye, and other grains.

Changes in the form, proportion, size, and the minor details of construction within the scope of the appended claims may be resorted to without departing from the spirit or sacrificing any of the advantages of this invention.

Having thus described the invention, what I claim is—

1. In loading and unloading apparatus, a receptacle, and a folding butt-board applied to a wall of the receptacle and adapted to be turned down against the outer side of said wall and to be raised to a vertical position, the lower edge of the butt-board and the top edge of the said wall coming squarely together, forming a butt-joint to limit the movement of the butt-board when raised, substantially as described.

2. In an apparatus for loading and unloading, a receptacle open at its upper end, suspension devices applied to the upper open end at or near the corners of the receptacle, and a butt-board hinged to one wall of said receptacle to extend vertically above and in the plane thereof and adapted to fold outward and downward against the outer side of said wall so as to be out of the way of the suspension devices, substantially as set forth.

3. In an apparatus for loading and unloading, a receptacle provided with the suspension devices, a hinged bottom, a catch applied to the swinging edge of the bottom, and oppositely-disposed pivoted latch members adapted to engage with opposite sides of the catch, substantially as specified.

4. In an apparatus for loading and unloading, a receptacle provided with suspension devices, a hinged bottom, a catch applied to the swinging edge of the bottom, vertically-disposed latch members pivoted to swing in a plane parallel with the wall of the receptacle to which they are applied and having their upper ends spaced apart and their lower ends adapted to engage with opposite sides of the catch, and a trip-cord having divergent branches attached to the upper spaced ends of the latch members, substantially as described.

5. In an apparatus for loading and unloading, a self-closing bottom hinged to the receptacle, stop-rods located within the receptacle and connected to the bottom and slidably confined to the said receptacle to positively arrest the descent of the swinging edge portion of the bottom under the weight of the load therein, and a latch mechanism between the receptacle and its bottom to positively hold the latter in a closed position against the weight of the load therein, the same consisting of a latch, and oppositely-disposed pivoted latch members, substantially as described.

6. In an apparatus for loading and unloading, a receptacle, a bottom hinged thereto, a catch fastened to the free edge of said bottom, latch members pivoted together and to the receptacle by the same pivot-fastening and adapted to swing in a plane parallel with the wall to which they are attached and having their ends outwardly divergent, and a spring attached to the receptacle at a point between the upper diverging ends of the latch members to properly position them and to hold their clutching ends in engagement with opposite sides of the said catch, substantially as set forth.

In testimony that I claim the foregoing as my own I have hereto affixed my signature in the presence of two witnesses.

THOMAS M. McINTOSH.

Witnesses:
WILLIAM M. LOWMAN,
JOHN SNIDER.